(12) United States Patent
Betts et al.

(10) Patent No.: US 11,033,019 B2
(45) Date of Patent: Jun. 15, 2021

(54) PHOTOGRAPHIC CAMOUFLAGED SCENT-FREE GAME CALLS AND METHOD OF MANUFACTURING SAME

(71) Applicant: DEADSHOT CUSTOMS LLC, Detroit Lakes, MN (US)

(72) Inventors: Christopher R. Betts, North Liberty, IA (US); Zachary Martin Hornberg, Keosauqua, IA (US); Brian Matthew Rubenstein, Detroit Lakes, MN (US)

(73) Assignee: Deadshot Customs LLC, Detroit Lakes, MN (US)

( * ) Notice: Subject to any disclaimer, the term of this patent is extended or adjusted under 35 U.S.C. 154(b) by 0 days.

(21) Appl. No.: 16/533,910

(22) Filed: Aug. 7, 2019

(65) Prior Publication Data

US 2019/0357522 A1 Nov. 28, 2019

Related U.S. Application Data

(63) Continuation-in-part of application No. 15/831,015, filed on Dec. 4, 2017, now abandoned, which is a continuation of application No. 15/053,535, filed on Feb. 25, 2016, now Pat. No. 9,848,596, which is a continuation-in-part of application No. 14/022,373, filed on Sep. 10, 2013, now abandoned, which is a continuation of application No. 13/847,314, filed on Mar. 19, 2013, now Pat. No. 8,672,725.

(60) Provisional application No. 62/875,681, filed on Jul. 18, 2019, provisional application No. 61/719,183, filed on Oct. 26, 2012.

(51) Int. Cl.
*A01M 31/00* (2006.01)

(52) U.S. Cl.
CPC .............................. *A01M 31/004* (2013.01)

(58) Field of Classification Search
CPC ........................... A01M 31/00; A01M 31/004
See application file for complete search history.

(56) References Cited

U.S. PATENT DOCUMENTS

| | | | |
|---|---|---|---|
| 2,518,616 | A | 8/1950 | L |
| 2,730,836 | A | 1/1956 | Faulk et al. |
| 3,066,444 | A | 12/1962 | Dieckmann |
| 4,151,678 | A | 5/1979 | Robertson |
| 4,816,259 | A | 3/1989 | Matthews et al. |
| 4,950,201 | A | 8/1990 | Sceery |
| 4,968,283 | A | 11/1990 | Montgomery |

(Continued)

OTHER PUBLICATIONS

Flambeau Painted Lady Duck Call Lure by Flambeau; Image from Amazon.com.

(Continued)

*Primary Examiner* — Eugene L Kim
*Assistant Examiner* — Alyssa M Hylinski
(74) *Attorney, Agent, or Firm* — Simmons Perrine Moyer Bergman PLC

(57) ABSTRACT

A game call configured to emulate a sound of a predetermined species of animal, the call comprising a mouthpiece section, with a digitally reproduced image displayed thereon, in a manner such that the digitally reproduced image specifically relates to said predetermined species. A method of using a vacuum chamber, an internal fixture and a plurality of ventilated molds, which utilizes commercial off-the-shelf PVC piping components, for making molded image wrapped rods.

16 Claims, 18 Drawing Sheets

(56) References Cited

U.S. PATENT DOCUMENTS

| | | | |
|---|---|---|---|
| 5,019,008 A | 5/1991 | Hughes | |
| 5,090,937 A | 2/1992 | LaRue et al. | |
| 5,484,320 A | 1/1996 | Becker | |
| 5,778,590 A | 7/1998 | Browning et al. | |
| 6,053,794 A | 4/2000 | Weiser | |
| 6,516,548 B2* | 2/2003 | Lage | G09F 23/08 40/310 |
| 6,527,614 B1* | 3/2003 | Primos | A01M 31/004 446/207 |
| 7,377,859 B2* | 5/2008 | Reardon | A63B 53/14 473/300 |
| 7,608,002 B2 | 10/2009 | Robert et al. | |
| 7,658,660 B1 | 2/2010 | Drury | |
| 7,918,709 B1 | 4/2011 | Primos et al. | |
| 3,287,631 A1 | 10/2012 | Baum et al. | |
| 8,672,725 B1* | 3/2014 | Betts | A01M 31/004 446/207 |
| 9,848,596 B2* | 12/2017 | Betts | A01M 31/004 |
| 2003/0104884 A1 | 6/2003 | Eastman | |
| 2005/0133947 A1* | 6/2005 | Jang | B29C 39/025 264/162 |
| 2005/0150073 A1 | 7/2005 | Sham | |
| 2006/0141185 A1 | 6/2006 | Takahashi | |
| 2008/0274318 A1 | 11/2008 | Takada et al. | |
| 2008/0297685 A1 | 12/2008 | Sugibayashi et al. | |
| 2009/0017269 A1 | 1/2009 | Johnson | |
| 2009/0258566 A1 | 10/2009 | May | |
| 2011/0265953 A1* | 11/2011 | Kroell | B41M 5/025 156/378 |

OTHER PUBLICATIONS

Willie's Camo Max Duck Call by Willie Robertson; Image from L.L. Bean Website.

* cited by examiner

PHOTOGRAPHIC CAMOUFLAGED SCENT-FREE GAME CALLS AND METHOD OF MANUFACTURING SAME

CROSS-REFERENCE TO RELATED APPLICATION

This application claims the benefit of the filing date of the provisional patent application with the same title and filed Jul. 18, 2019 and having Ser. No. 62/875,681, and is a continuation-in-part application of the non-provisional patent application with the same title and filed on Dec. 4, 2017, and having Ser. No. 15/831,015, which application is a continuation of and claims the benefit of the non-provisional patent application with the same title and filed by Christopher R. Betts and Zachary Martin Hornberg on Feb. 25, 2016, and having Ser. No. 15/053,535, which has issued as a patent on Dec. 26, 2017 with U.S. Pat. No. 9,848,596, and which application is a continuation-in-part and claims the benefit of the filing date of the non-provisional patent application with the same title and filed by Christopher R. Betts on Sep. 10, 2013, and having Ser. No. 14/022,373, now abandoned; which was a continuation of the non-provisional patent application with the same title and filed by Christopher R. Betts on Mar. 19, 2013, having Ser. No. 13/847,314, issued on Mar. 18, 2014 with U.S. Pat. No. 8,672,725 and the filing date of the provisional patent application with the same title and filed by Christopher R. Betts on Oct. 26, 2012, and having Ser. No. 61/719,183, which applications are incorporated herein by reference in their entirety.

BACKGROUND OF THE INVENTION

The present invention generally relates to game calls and, more particularly, to camouflaged and decorative game calls.

In the past, it is well known to have painted game calls, where the exterior of the call is painted with various patterns or images.

Camouflage calls have been painted for many years, and have enjoyed considerable success in the past. However, these calls have had several drawbacks.

When these painted calls are used, they usually are exposed to moisture and are frequently subjected to physical impacts, which can dent or scratch the exterior surface of the call, increasing the potential for paint fragmentation to occur. Since, by their design, calls are made to contact the mouth of the hunter, ingestion of minute paint fragments from the exterior painted surface is a distinct possibility. Additionally, camouflaged game calls may have been painted with paint containing undesirable compounds, such as latex, which can be problematic for some hunters, or Volatile Organic Compounds, or VOCs, which may cause an undesirable effluent of VOCs, which could be especially problematic if used with a deer grunt call or an elk bugle call, where even the smallest unnatural scent could possibly be recognized by such big game animals as something to avoid.

Consequently, there exists a need for improved methods and apparatuses for providing calls which are camouflaged, or otherwise decorated, while minimizing the potential for ingestion of paint fragments, and reducing the problems associated with VOCs emanating from a painted surface.

SUMMARY OF THE INVENTION

It is an object of the present invention to provide enhanced abilities to reduce ingestion of paint fragments, and release of VOCs from painted surfaces, while using hunting game calls.

It is a feature of the present invention to include in the game call, an inner acrylic tube with a patterned image thereon.

It is an advantage of the present invention to reduce paint fragment ingestion and VOC release from painted surfaces.

It is another object of the present invention to provide for increased ability to accommodate lathe customization of a game call blank after a patterned image has been applied.

It is another feature of the present invention to provide a transparent molded epoxy resin layer exterior to the surface of the patterned image.

It is another advantage of the present invention to create a market for unfinished game call blanks which have a painted decorative pattern thereon, which can be customized by turning on a lathe without disturbing the painted decorative pattern.

The present invention is an improved method and apparatus for providing customized and customizable game calls and game call blanks, which improvement is designed to satisfy the aforementioned needs, provide the previously stated objectives, include the above-listed features, and achieve the already articulated advantages. The present invention is carried out in a "paint fragment and paint VOC-less" system in the sense that a substantial reduction in number of paint fragments that will be ingested and paint VOCs released by the painted game call of the present invention.

Accordingly, the present invention relates to a wild game taking aid, comprising:
  wild game taking aid insert;
  a wild game taking aid cover, which is matched with said wild game taking aid insert, when said wild game taking aid insert is inserted into said wild game taking aid cover, and air is blown through said wild game taking aid cover, a sound is made which resembles a sound made by an animal; and
  said wild game taking aid cover further comprising:
    a tube, wherein said tube has a first cylindrical surface and a second cylindrical surface; said first cylindrical surface being sized and configured to receive and to retain, therein, a portion of said wild game taking aid insert;
    an image disposed on said second cylindrical surface of said tube;
    an outer translucent member;
    said outer translucent member having a cylindrical inner surface; and
    a contoured outer surface, having a differential thickness characteristic, through which said image is visible.

The invention further relates to a method of making a wild game taking aid comprising the steps of:
  providing a wild game taking aid insert;
  providing a tube having a first surface and a second surface; said first surface being sized and configured to receive and to retain, therein, a portion of said wild game taking aid insert, including said sounding board and said reed;
  disposing an image around said second surface; and
  disposing a translucent cover with a cover surface over said image.

Lastly, the invention relates to making a wild game taking aid comprising the steps of:
  providing an elongated transparent member having a circular cross-section, and an outer cylindrical surface;

providing image matter, with a predetermined image thereon, configured to cling to said outer cylindrical surface without use of an adhesive;

wrapping said image matter around said outer cylindrical surface to form an unmolded image wrapped member;

providing a cylindrical mold disposed around said unmolded image wrapped member;

centering said unmolded image wrapped member within said cylindrical mold;

filling said cylindrical mold with a fluid which can form a transparent hard surface;

reducing an air pressure characteristic in said cylindrical mold so as to facilitate a reduction of aggregate bubble interior space in bubbles in said fluid;

removing a molded image wrapped member from said cylindrical mold, where said predetermined image is visible through an outer portion of said molded image wrapped member; and deploying said molded image wrapped member as a portion of a wild game taking aid.

BRIEF DESCRIPTION OF THE DRAWINGS

The invention may be more fully understood by reading the following description of preferred embodiments of the invention, in conjunction with the appended drawings wherein.

DETAILED DESCRIPTION

Figure 1:
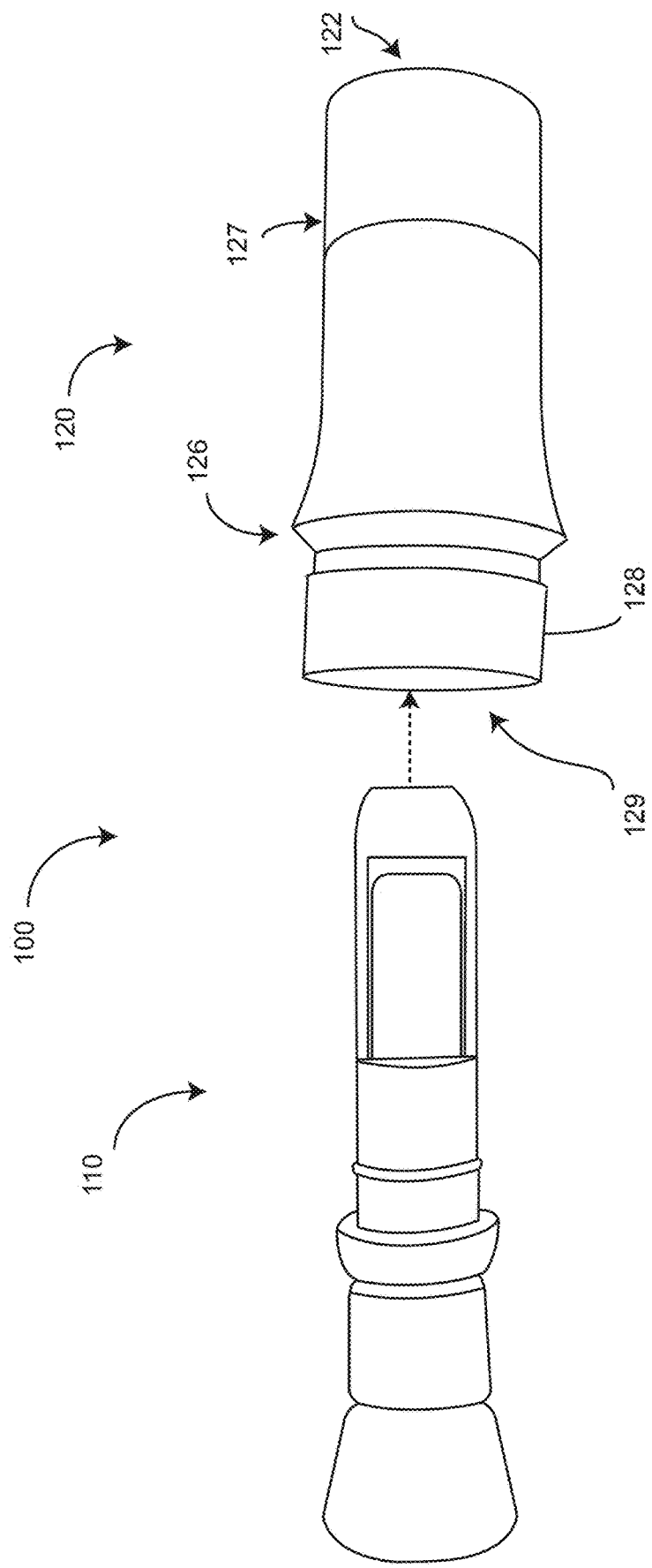
FIG. 1 is an exploded perspective view of a game call of the present invention.

Now referring to the drawings, wherein like numerals refer to like matter throughout, and more particularly to FIG. 1, there is shown a camouflaged game call 100 of the present invention, which includes a camouflaged game call reed/hand piece insert 110, and a camouflaged game call mouthpiece/reed cover 120. The call is shown in an all white camouflage but other more elaborate patterns of contrasting colors could be substituted as well. Camouflaged game call reed/hand piece insert 110 is shown as a double reed duck call insert, however, this is merely an example of many different inserts which could be utilized to make many different types of game calls. The present invention is focused upon the camouflaged game call mouthpiece/reed cover 120 which is adapted and configured to receive whatever insert is utilized for any particular call application. Camouflaged game call mouthpiece/reed cover 120 is shown as a camouflage call; however the image or pattern that is displayed is variable with many different types of camouflage, and many different types of decorative and non-camouflage patterns. The camouflaged game call mouthpiece/reed cover 120 has a mouth contact end 122 and an opposing reed insertion end 129. Camouflaged game call mouthpiece/reed cover 120 is shown with a lathe-turned contoured outer epoxy resin surface 126 which is transparent, and permits the camouflage image to be seen clearly. There is also shown an optional internal information displaying ring 127, which could be decorative or used to provide information about the call, such as manufacturers' name, model and even a serial number for custom calls. Optional internal information displaying ring 127 is disposed outside of the camouflage image, but inside of the lathe-turned contoured outer epoxy resin surface 126. Also shown is an optional exterior decorative ring 128, which is shown as a ring which matches the camouflaged game call reed/hand piece insert 110, and is disposed outside of the lathe-turned contoured outer epoxy resin surface 126.

Figure 2:
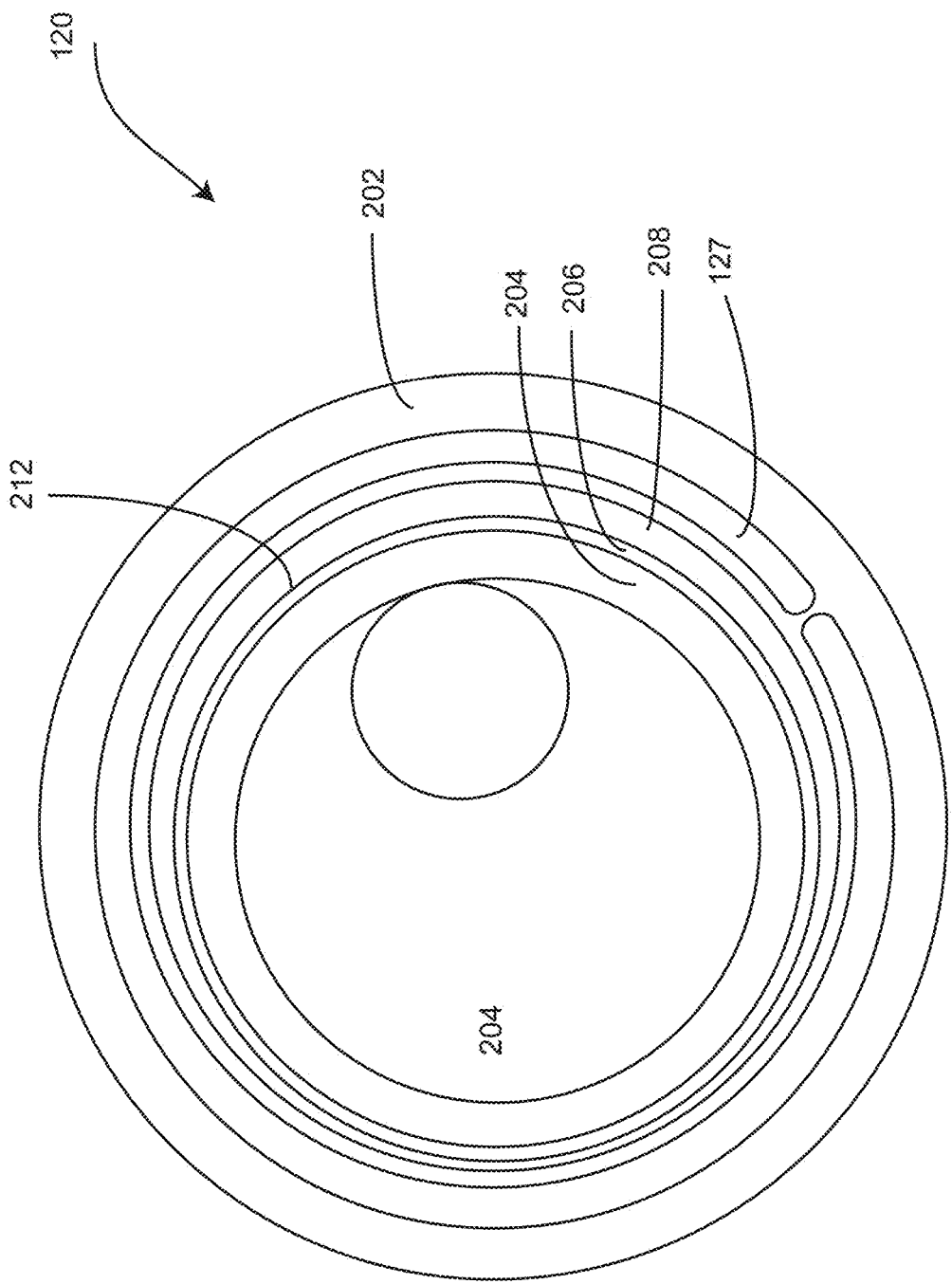
FIG. 2 is an enlarged end-view of the game call of FIG. 1.

Now referring to FIG. 2, there is shown an end-view of the camouflaged game call mouthpiece/reed cover 120 of FIG. 1. Camouflaged game call mouthpiece/reed cover 120 is shown as having a clear epoxy resin exterior surface 202, which is similar to the lathe-turned contoured outer epoxy resin surface 126 of FIG. 1, except that it is not as thick as the thickest portion shown in FIG. 1. Camouflaged game call mouthpiece/reed cover 120 comprises an acrylic inner tube 204, which has had applied thereto an acrylic inner tube base-coat paint 206. Applied to the acrylic inner tube base-coat paint 206, is acrylic inner tube patterned image 208. Clear epoxy resin interior surface 212 is shown disposed adjacent to acrylic inner tube patterned image 208; however, there may be a very thin layer of VOC clear coat applied over the acrylic inner tube patterned image 208, and therefore between the acrylic inner tube patterned image 208 and the clear epoxy resin interior surface 212. Also shown is optional internal information displaying ring 127.

The present invention can be manufactured using the following process:

Full length 36" acrylic tubes are cut into 2⅝ inch (2.625) length sections. Each cut section is then hand sanded, at both ends, to ensure a smooth and clean finish (see FIG. 2 #204). Each cut tube is then cleaned, with Alcohol, to rid the substrate of any contaminates, and installed onto "jigs" (12 tubes per jig). Each Jig is then transferred to the spray booth, where the tubes go through another cleaning using Lacquer thinner. This process eliminates any further contaminates and prepares the tubes for their base-coat color.

Once the acrylic tubes 204 have dried, the base-coat 206 is now applied to the tubes in preparation for the next step, which is the Hydrographic Printing (depending upon the style/effect that is to be achieved; the base-coat 206 can be Waterborne, designed specifically for Hydrographic Printing, or VOC style paint).

After the base-coat 206 has been allowed to dry thoroughly, they are removed from the paint booth to the dipping area. Once in the dipping area, a printed pattern PVA (poly-vinyl alcohol) film is cut to size for each jig that is to be hydro-dipped. The cut film is then transferred over to a specially designed dipping tank, where it lays suspended on heated water at 39 degree C. to hydrate the film for approximately 60 seconds. (*note: temperature and time varies depending upon manufacturer/style of printed pattern.)

Once the hydration period ends, an "activator", specially manufactured to use in Hydrographic printing, is applied with a spray gun to the top of the film as it lies on the water. This releases the ink from the PVA film and the ink is now floating on the water. The base-coated tubes, which are in sets of 12 per jig, are then strategically dipped through the floating ink at a specific angle. As the tubes are being submerged through the floating ink, the ink/film 208 wraps around the tubes and becomes "infused"/etched onto the base-coat. When fully submerged, the tubes are completely wrapped in the pattern 208 and are then taken to the rinse area, where they remain for three to five minutes to remove any and all residue left behind from the activated film. They are then removed from the rinse area, blown off with air to remove excess water, and then hung on a rack to dry thoroughly.

After the tubes have dried completely, they are transferred to the spray booth, where a VOC clear coat is applied to preserve the image 208 from any damage; and remain there until the clear coat has completely dried. Once dry, the tubes are ready to be transferred to the molding boxes.

Molding boxes can be specifically designed and fabricated from Aluminum and Silicone molding material, which could be AeroMarine 128 Silicone Moldmaking Rubber (available from AeroMarine Products Inc. of 8659 Production Avenue San Diego, Calif. 92121) to meet the specs in the design of the duck calls. "Dummy" blanks could be used in making the silicone mold to achieve the specifications and dimensions of the actual duck call "blanks". The box dimensions are approximately 3" w×4" h×34" 1, and can generate 12 calls per box. The front plate on each box is removable to allow access for extraction of the molded pieces, which are referred to as "blanks".

Each hydro-dipped tube 204, 206 and 208 (also optional internal information displaying ring 127 could be included at this point) is then transferred to a ⅝" aluminum rod, where each end of the decorated tube is sealed with 401 Locktite to prevent air bubbles from forming due to the heat generated by the epoxy curing during the molding process. While the sealant is drying, the silicone mold is being prepared by applying petroleum jelly to all exposed areas of the mold as a releasing agent. The aluminum rods, with the decorated tubes, are then inserted into the box, leaving the tube suspended and centered in each of the 12 areas where the blanks are formed. The box is then assembled and transferred to the pouring area.

A mixture of Cycloaliphatic Clear Epoxy resin, which could be AeroMarine Cycloaliphatic "Non Blushing" Clear Epoxy #300/21 (and is available from AeroMarine Products Inc. of 8659 Production Avenue San Diego, Calif. 92121) is mixed (2:1 ratio) and is then poured into each mold of 12 until full, and allowed to cure. This resin is a latex-free food-safe resin. Other similar resins could be used as well. Cure time varies between 8-12 hours, depending upon external room temperature. Once the epoxy has cured, each box is then disassembled and the call "blanks" are removed from the mold, and inspected for defects/bubbles.

FIG. 2 is a cross-sectional picture of the encapsulated tube in the epoxy resin lathe-turned contoured outer epoxy resin surface 126.

The blank, i.e. camouflaged game call mouthpiece/reed cover 120, is shown after machining to desired shape. It was mounted on an expanding mandrel for the lathe. Once the desired shape is established, you can then finish with a final polish and buffing. If desired, a decorative band, i.e. optional exterior decorative ring 128, can be added at this stage as well by using an arbor press and pressing the band on the base of the machined and polished part.

The terms camouflage and camouflaged are intended to mean more than just one particular type or style of camouflage. Many commercial and well known designer camouflage patterns exist. The means of the term is intended to be inclusive, and a call which is all white could be considered camouflaged for winter use.

Figure 3:
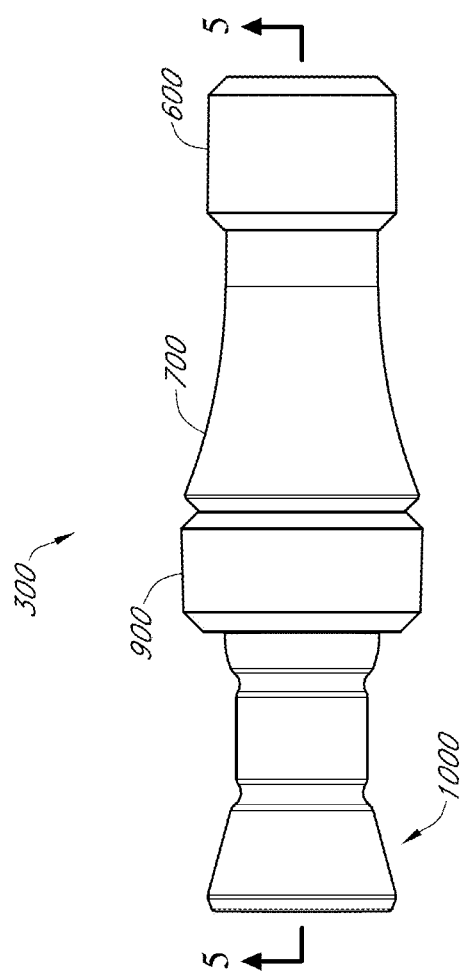
FIG. 3 is a perspective view of a game call that is one embodiment of the present invention.

Now referring to FIG. 3, there is shown an alternate embodiment of the present invention generally designated 300, which includes a game call mouthpiece 600, transparent cover 700 with an inner tube disposed therein, an outlet end cap 900, and a game call reed insert portion 1000.

Figure 4:
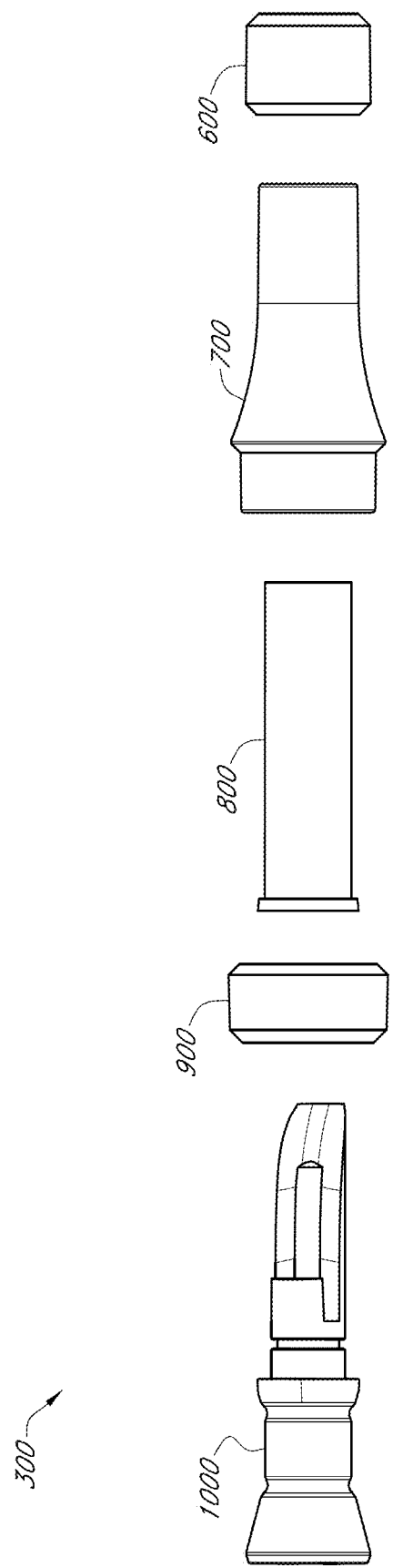
FIG. 4 is an exploded perspective view of the game call of FIG. 3.

Now referring to FIG. 4, there is shown an exploded view of the game call 300 of FIG. 3 where the inner tube 800 is shown outside of the transparent cover 700. Note that portions of the game call reed insert portion 1000, such as the reed(s) and the O ring are not included, but would be in a working embodiment of the present invention.

Figure 5:
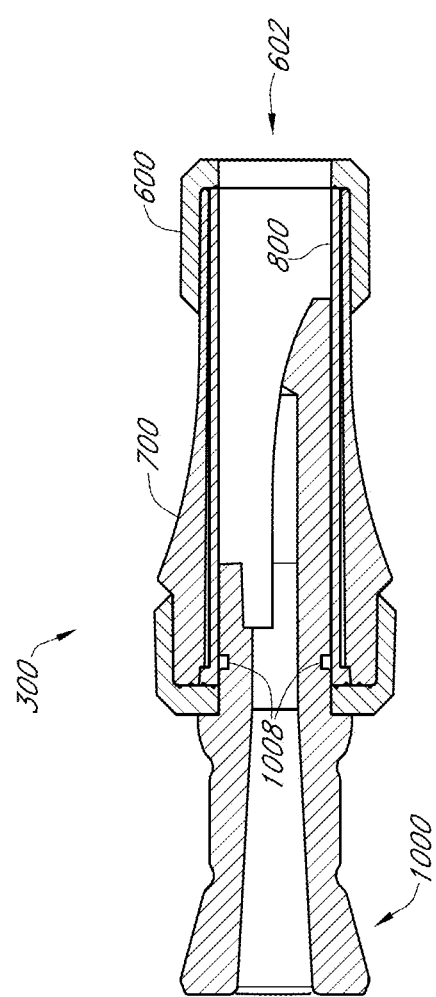
FIG. 5 is a cross-section view of the game call of FIG. 3.

Now referring to FIG. 5, there is shown a cross-sectional view of the game call 300 in a partially assembled state. The reed(s) and O ring, which are a part of the present invention, are not shown.

Figure 6:
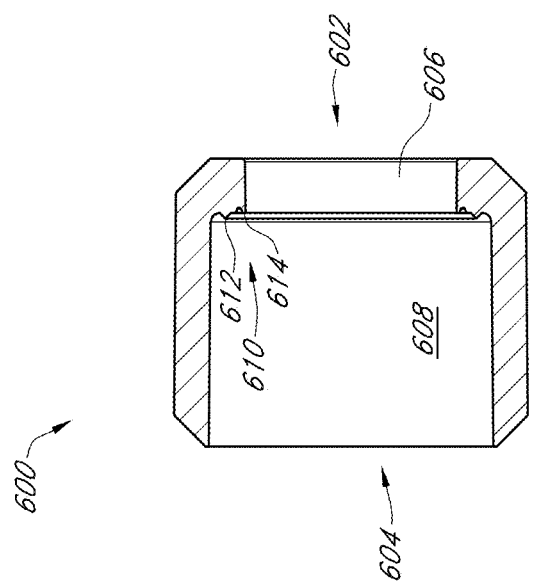
FIG. 6 is a cross-section view of a component of the game call of FIG. 3.

Now referring to FIG. 6, there is shown a game call mouthpiece 600 with a game call mouthpiece air inlet end 602 and an opposing game call mouthpiece air outlet end 604. Game call mouthpiece cap section 606 comprises a void for air to enter and a game call mouthpiece to transparent cover sealing section 610 formed at the interface with game call mouthpiece to transparent cover mating section 608. Game call mouthpiece to transparent cover sealing section 610 has a seal section first protuberance 612 and a seal section second protuberance 614 disposed thereon, each of which could be an annular protuberance with adjacent annular grooves. These protuberances and grooves are not as visibly pronounced as in FIG. 5 because that image is of these pieces after the transparent cover 700 and inner tube 800 (FIGS. 7 and 8, respectively) have been ultrasonically welded to each other and to game call mouthpiece 600 and outlet end cap 900 (FIG. 9). Alternate method of coupling these components could be employed, such as use of adhesives. The preferred embodiment may be ultrasonic welding.

Figure 7:
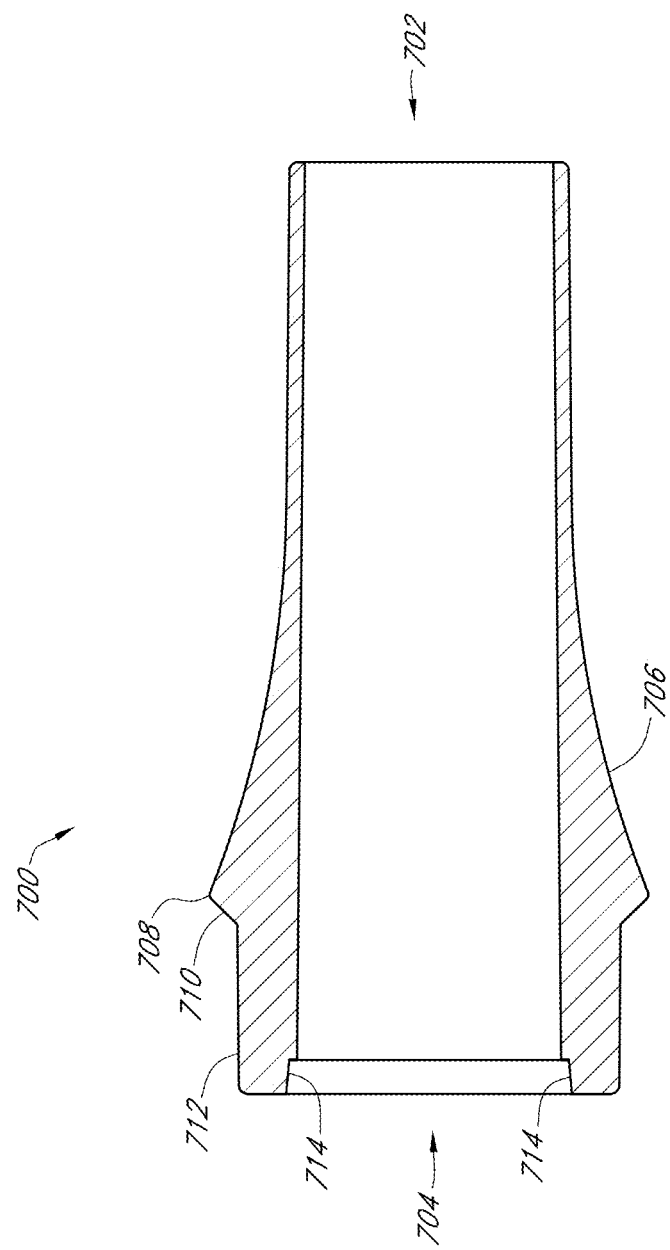
FIG. 7 is a cross-section view of a component of the game call of FIG. 3.
Figure 8:
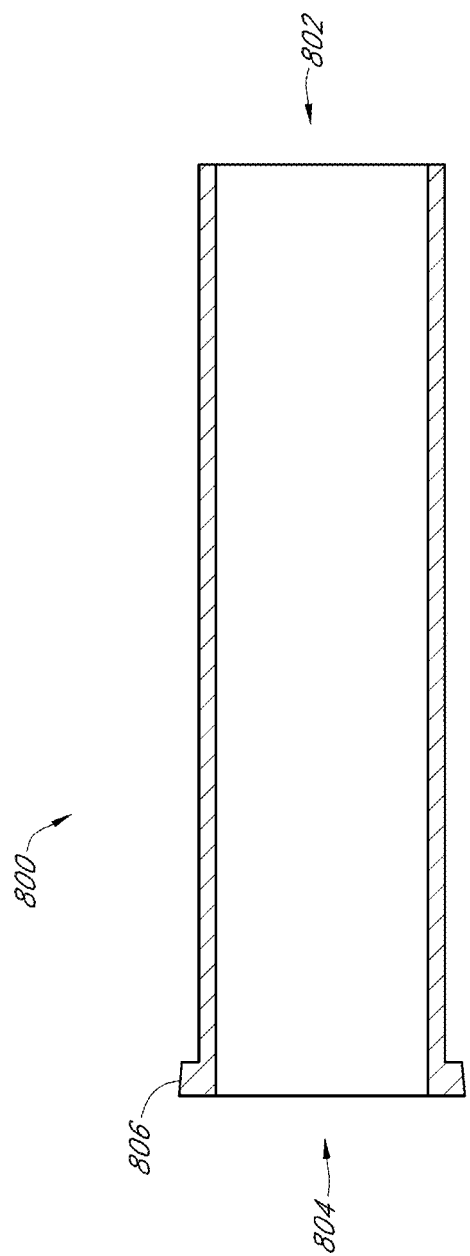
FIG. 8 is a cross-section view of a component of the game call of FIG. 3.
Figure 9:
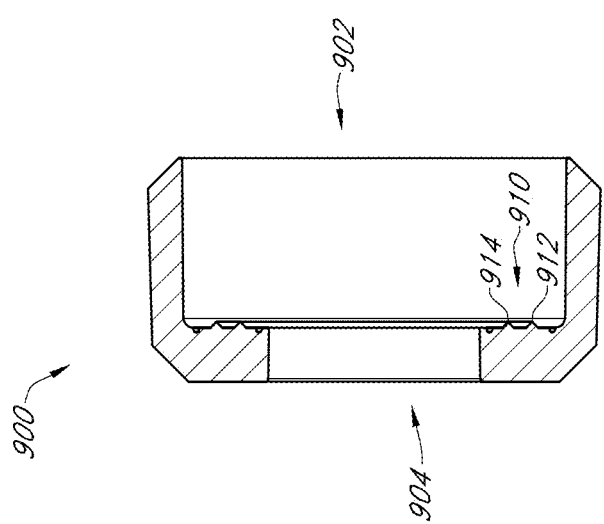
FIG. 9 is a cross-section view of a component of the game call of FIG. 3.

Now referring to FIGS. 7 and 8, there is shown a cross-section view of a transparent cover 700 having a transparent cover inlet end 702 and an opposing transparent cover outlet end 704. Transparent cover 700 is transparent and made of molded or machined materials which are suitable. It is shown with a transparent cover increasing thickness portion 706, a transparent cover maximum thickness portion 708, a transparent cover decreasing thickness portion 710, and a transparent cover constant thickness portion 712 thereon. Also shown is inner tube flange receiving void 714. The interior surface of transparent cover 700 is sized and configured to receive therein inner tube 800, which has an inner tube inlet end 802, an opposing inner tube outlet end 804 with an attached inner tube outlet end annular flange 806. Inner tube 800 may be made of the same material as game call mouthpiece 600 or inner tube 800, or a suitable substitute.

Now referring to FIG. 9, there is shown an outlet end cap 900 having an outlet end cap inlet 902 and an opposing outlet end cap reed insert receiving end 904. Outlet end cap to transparent cover sealing section 910 is shown where the transparent cover outlet end 704 and inner tube outlet end 804 meet with and preferably seal to the outlet end cap 900. Outlet end cap to transparent cover sealing section 910 is shown having an outlet end cap seal section first protuberance 912 and an outlet end cap seal section second protuberance 914, which could be concentric annular protuberances. Like the seal section first protuberance 612 and seal section second protuberance 614, these protuberance are not shown in FIG. 5 because the process of ultrasonically welding causes these protuberances to melt into the groove therebetween.

Figure 10:
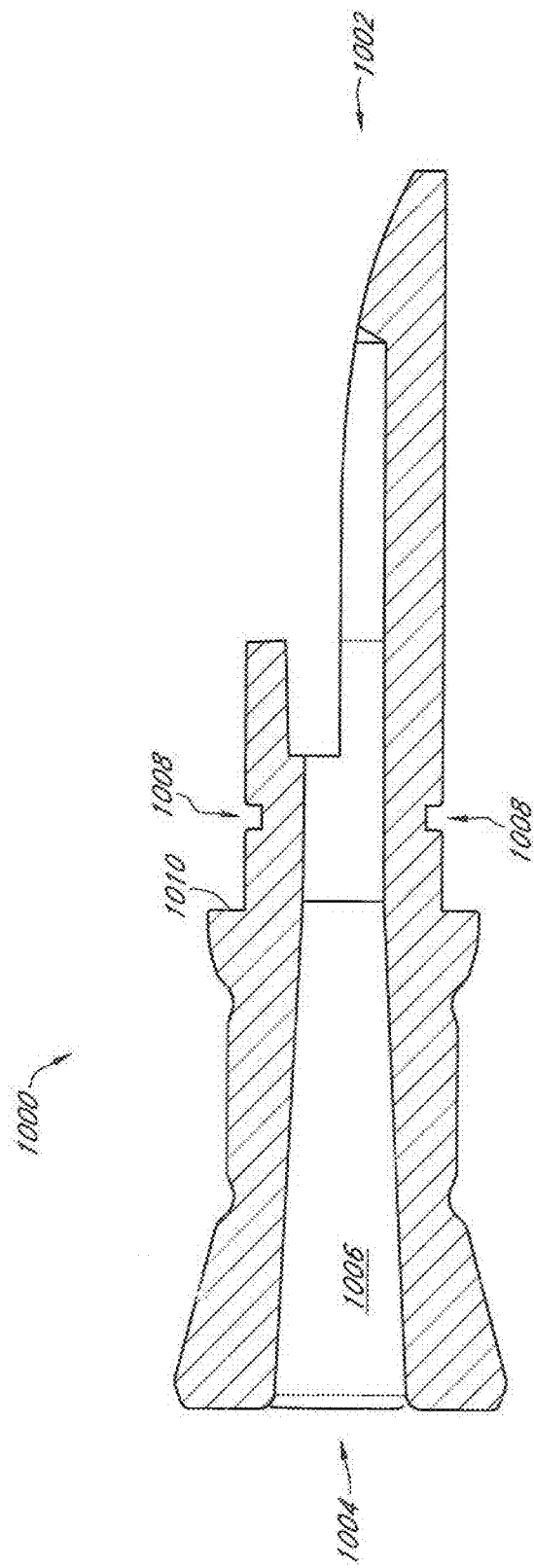
FIG. 10 is a cross-section view of a component of the game call of FIG. 3.

Now referring to FIG. 10, there is shown a game call reed insert portion 1000 which is similar to numerous prior art reed inserts in overall function and design and it includes a game call reed insert inlet end 1002, an opposite end 1004, a game call reed insert air passage void 1006, a game call reed insert O ring receiving void 1008, and a game call reed insert to outlet end cap stop portion 1010.

Figure 12:
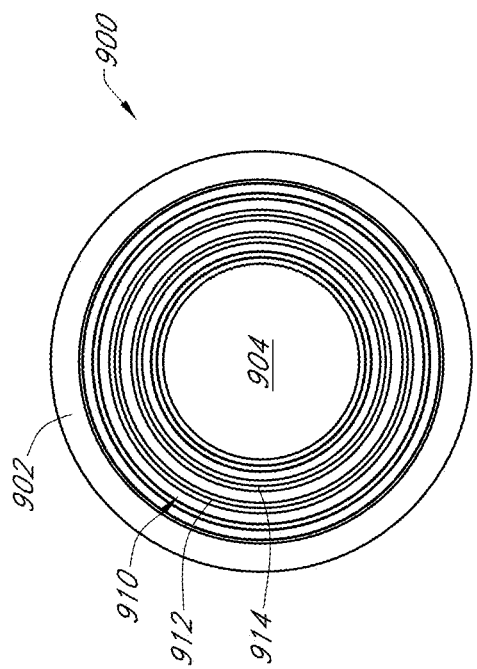
FIG. 12 is an end view of the component of FIG. 9.
Figure 11:
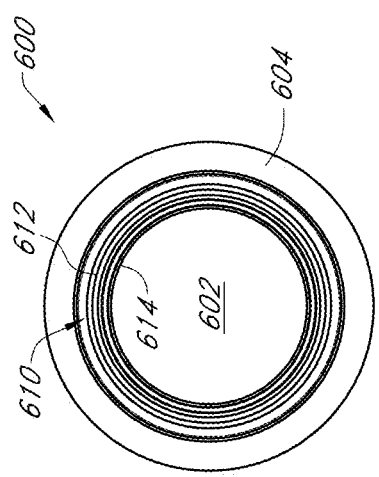
FIG. 11 is an end view of the component of FIG. 6.

Now referring to FIGS. 11 and 12, there is shown an end view of the game call mouthpiece 600 and the outlet end cap 900 with the seal section first protuberance 612 and seal section second protuberance 614 and the outlet end cap seal section first protuberance 912 and outlet end cap seal section second protuberance 914, respectively, before assembly and before any ultrasonic welding.

Figure 13:
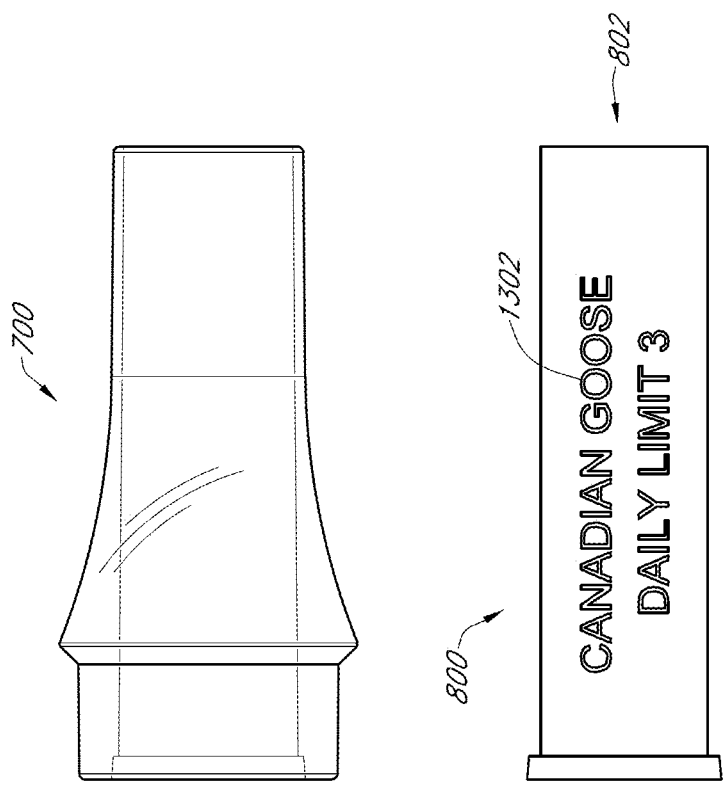
FIG. 13 is a perspective view of an alternate version of the component of FIG. 8, together with the component of FIG. 7.
Figure 14:
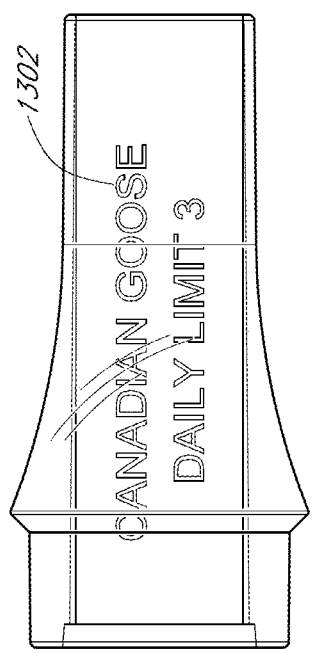
FIG. 14 is a subassembly of the components of FIG. 13.

Now referring to FIGS. 13 and 14, one of the beneficial aspects of the present invention is the ability to provide visual inspection of an internal protected surface of the game call. This surface can be photographic camouflage, an advertisement, information relating to the identification of and the regulations in relation to the game animals being sought by the users of the game call. For example, a Canada Goose call may have an image of a Canada Goose and may have text explaining the dates of the hunting season, bag limits etc. These differing visual patterns could be a removable sleeve that fit over the inner tube 800 before it is inserted into the transparent cover 700. In some embodiments, they could be replaced each year to reflect changes in regulations, etc. In such embodiments, there would be no ultrasonic welding used in the assembly and the game call mouthpiece 600, the transparent cover 700, the inner tube 800 and the outlet end cap 900 could all be friction fit or could be used with some light adhesive material. This adhesive could be chosen from a group of adhesive which could be overcome by application of sufficient mechanical force which may or may not be reduced by the prior use of solvents.

The present invention is a method and system for creating an innovative image rod which can be used for many different end products including, but not limited to, game calls.

Figure 15:
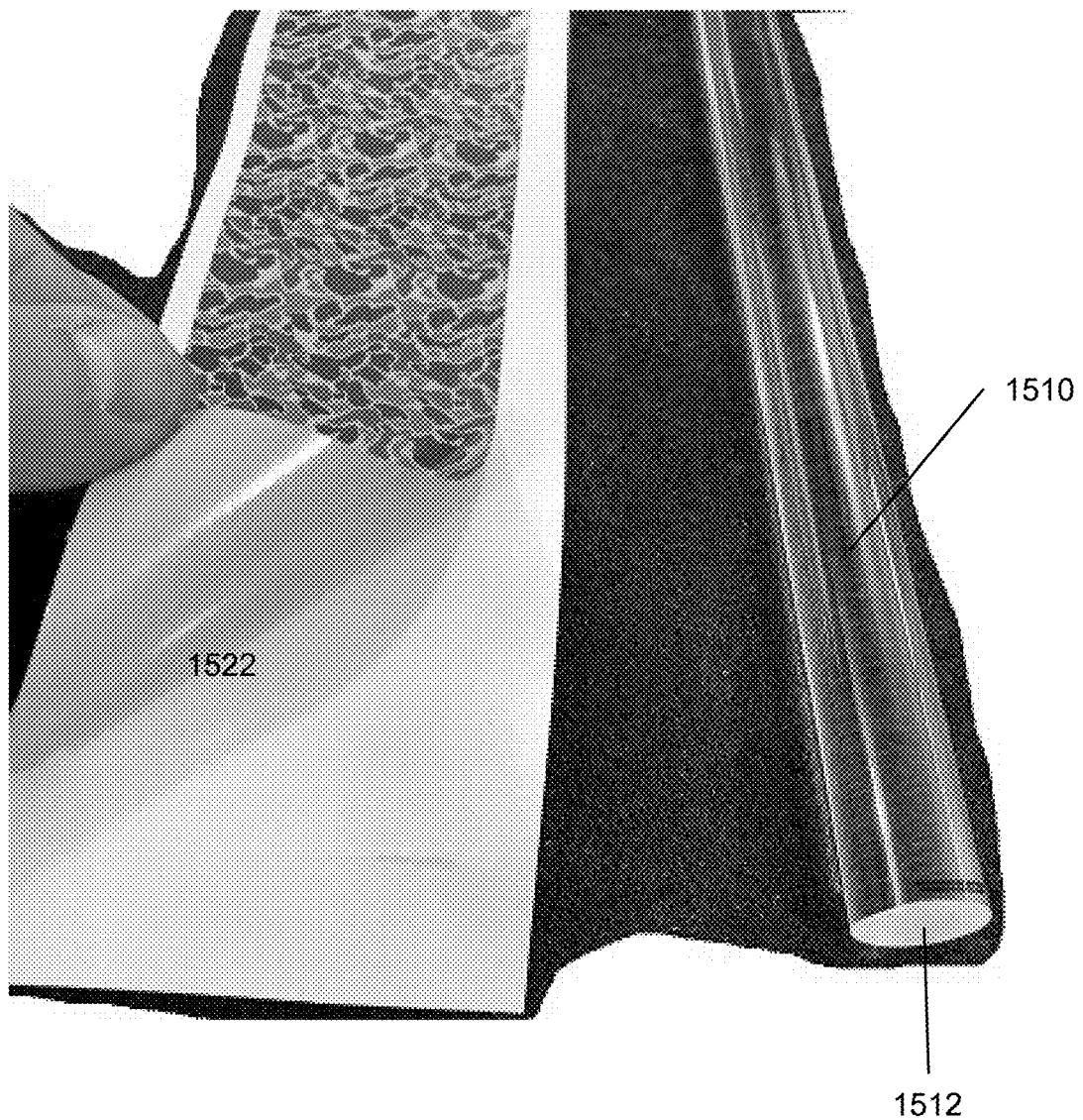
FIG. 15 is a perspective view of a solid rod and image material of the present invention in an unassembled state.

Now referring to FIG. 15, there is shown an early stage of manufacture of a finished image rod 1900 (FIG. 19) of the present invention. Finished image rod 1900 can be used in mass production of game calls as well as other wild game taking aids such as fishing poles. Moreover, finished image rod 1900 could be used for other hand held sporting goods, such as golf clubs, or even other non-sporting goods applications, as well as non-hand held applications. Shown in FIG. 15 is solid rod 1510, which could be a rod formed with acrylic resin or polycarbonate or other suitable transparent or translucent material. Solid rod 1510 is shown with a solid rod end 1512, which is solid and completely closed. In some embodiments of the present invention, solid rod 1510 could be substituted with a tube which would eliminate any need to bore a longitudinal central hole through the solid rod 1510 for applications such as game call covers including game call reed covers. In other embodiments, the finished image rod 1900 could be not completely bored through and may have a partial boring so as to receive another object, such as a fishing rod blank, golf club shaft etc. Solid rod 1510 can be purchased from many vendors with many different lengths, diameters and materials therein.

Solid rod 1510 shown next to an image matter 1520, which may be any wrap able type of matter with an image thereon, which could be caused to be located around an outer surface of solid rod 1510. Image matter 1520 could be opaque, translucent or transparent with any type of image of anything disposed thereon. In one embodiment, the solid rod 1510 could be a printed vinyl film, or a suitable substitute which clings, with or without an adhesive, to solid rod 1510 and which maintains a clean attachment surface by providing an image matter backing 1522.

Figure 16:
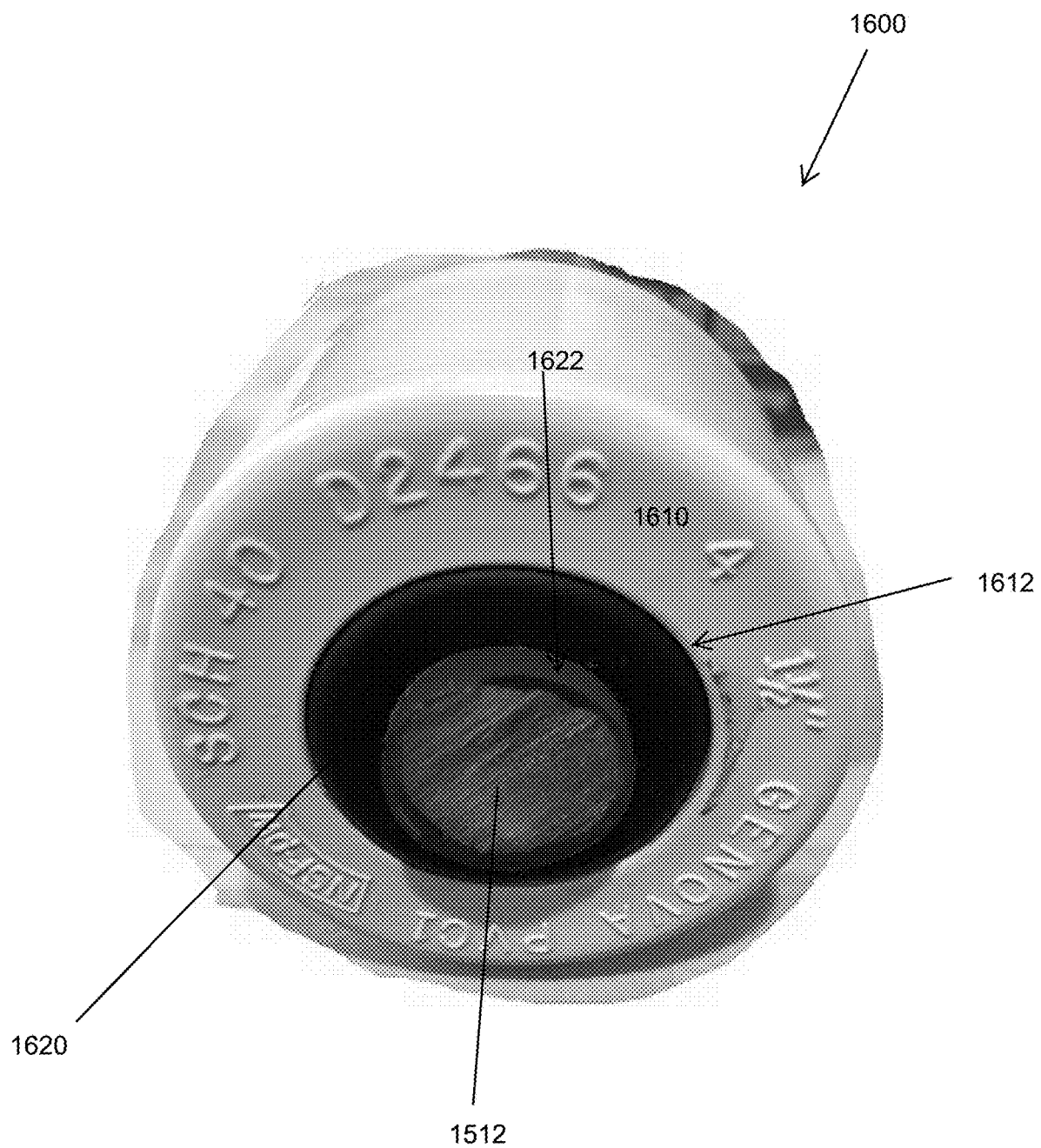
FIG. 16 is a perspective view of a bottom cap with a solid rod disposed therein.

Now referring to FIG. 16, there is shown an end cap 1600, which is shown as an off the shelf 1.5 inch PVC pipe end cap with an end cap bottom face 1610, with an end cap bottom face central orifice edge 1612. Shown disposed within the end cap bottom face central orifice edge 1612, is end cap bottom face central orifice grommet 1620, which may be made of plastic, rubber, or other material, which is capable of forming a leak proof interface with end cap bottom face central orifice edge 1612 and solid rod end 1512. End cap 1600, at an end opposing the end cap bottom face 1610, is configured to receive thereon a PVC pipe.

Figure 17:
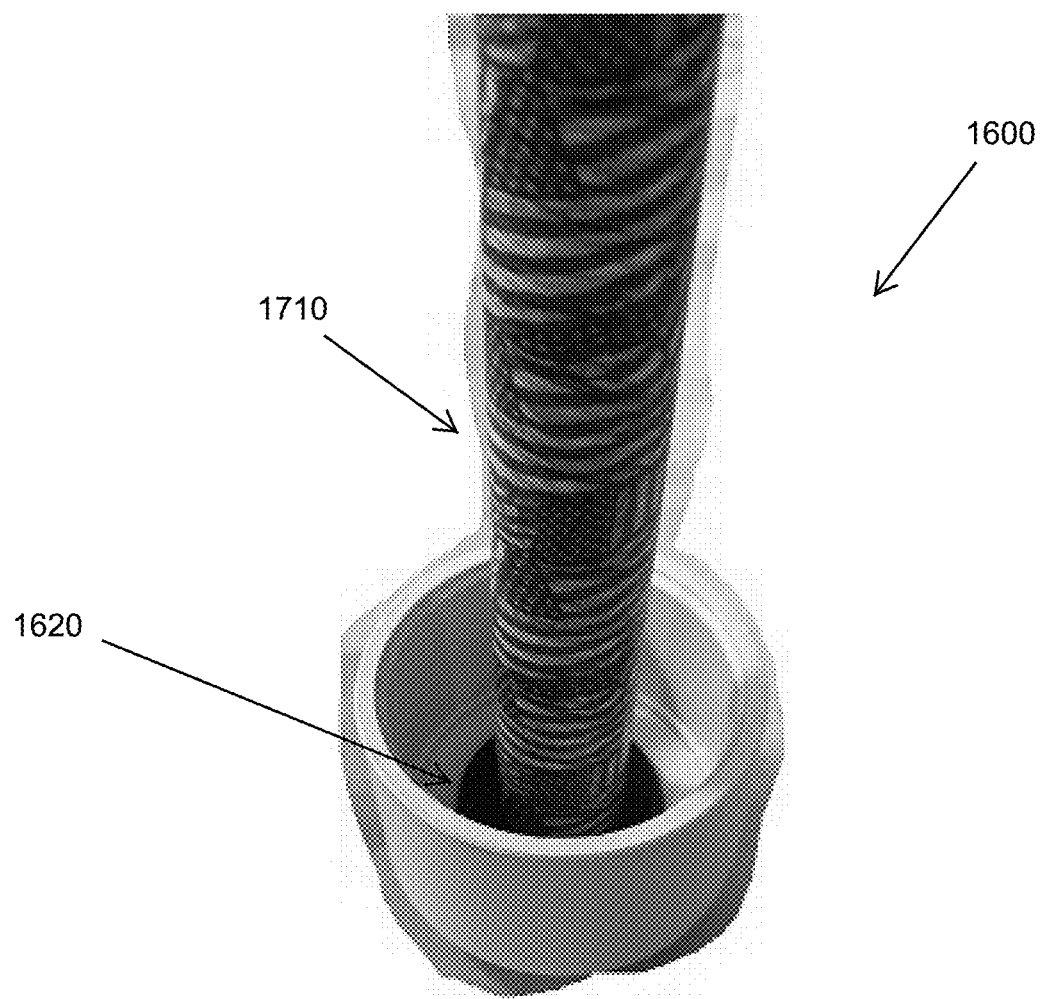
FIG. 17 is a perspective view of the bottom cap of FIG. 16 supporting a solid rod disposed therein.

Now referring to FIG. 17, there is shown the end cap 1600 with an unmolded image wrapped rod 1710 inserted through the end cap bottom face central orifice grommet 1620. A PVC pipe portion can be inserted into the interior portion of end cap 1600 to create a resin retaining structure capable of receiving and centrally retaining a solid rod end 1512. The unmolded image wrapped rod 1710 is shown disposed in the end cap 1600, without a PVC pipe inserted therein to better show how the solid rod end 1512 mates with the end cap bottom face central orifice grommet 1620.

Figure 18:
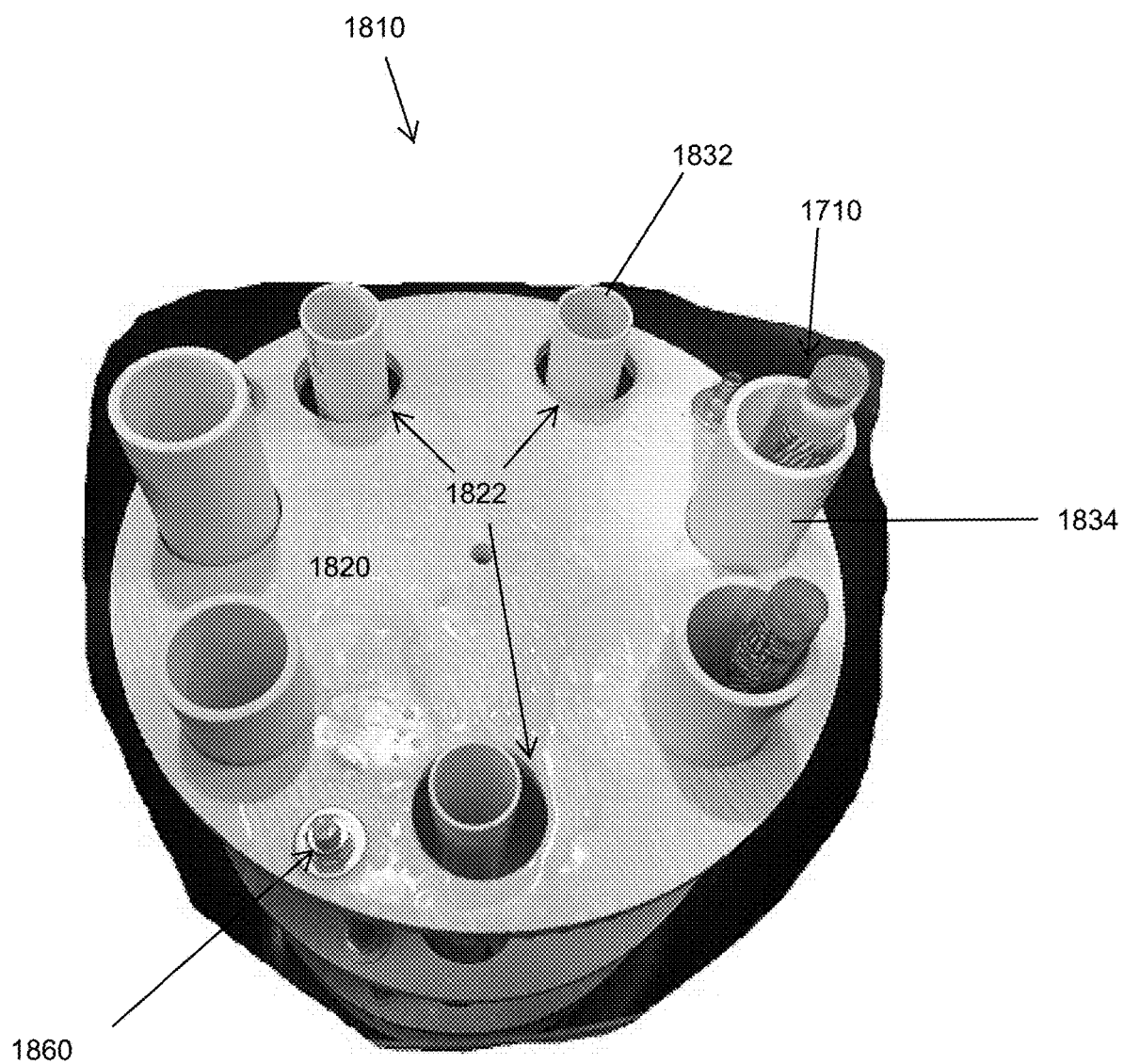
FIG. 18 is a perspective view of portions of a fixture of the present invention disposed in a pressure chamber of the present invention.

Now referring to FIG. 18, there is shown an image rod cover molding system 1800, which includes a molding system pressure chamber 1810, and a molding system fixture having a molding system fixture top plate 1820 with molding system fixture mold receiving plate orifices 1822, which may be of variable sizes and shapes depending upon the shape of mold that it is configured to support. Also shown are molding system fixture first intermediate plate 1840, and molding system fixture second intermediate plate 1850 and a molding system fixture inter plate support threaded rod 1860.

Figure 19:
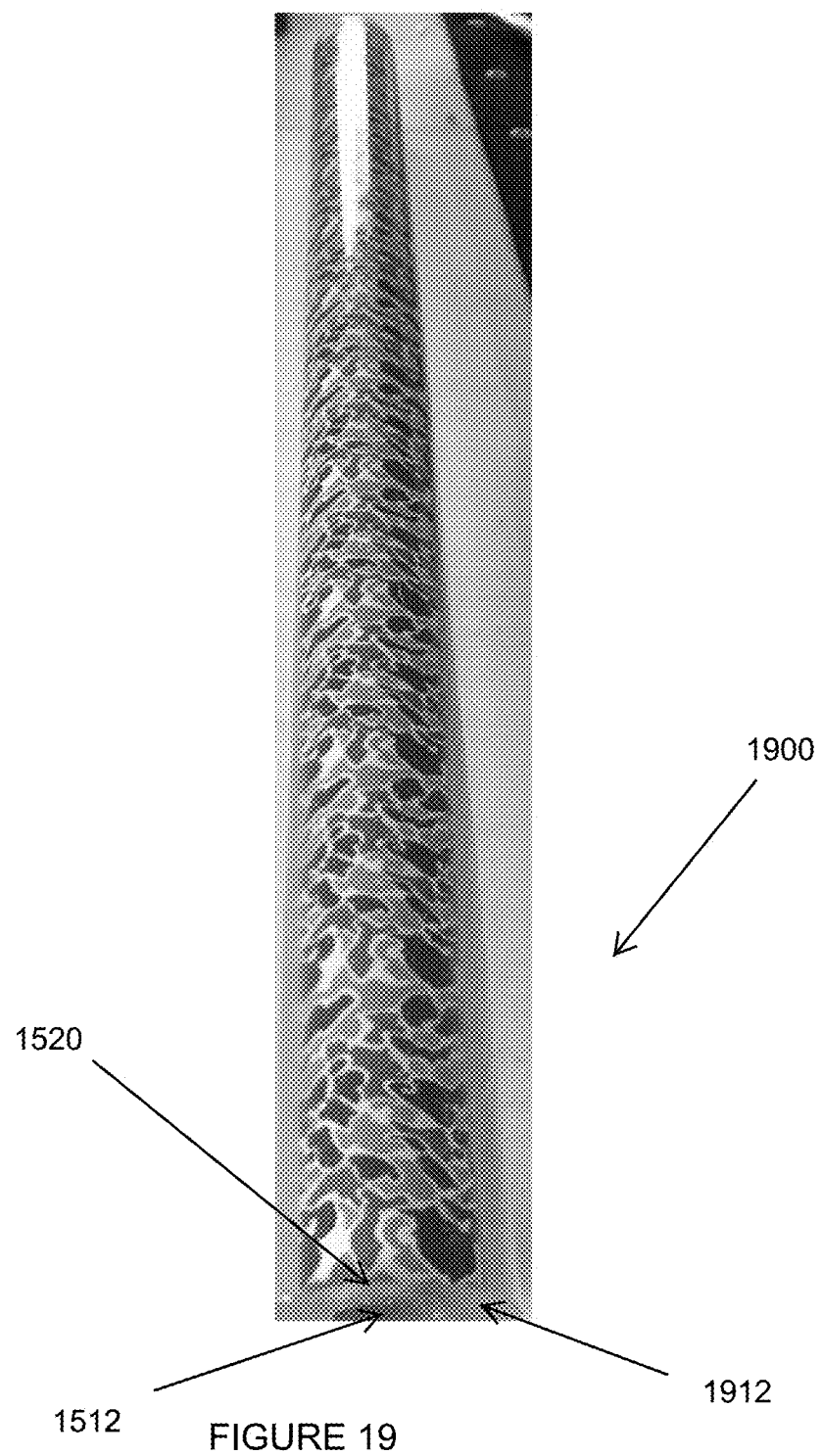
FIG. 19 is a perspective view of a finished image rod of the present invention.

Each of the molding system fixture mold receiving plate orifices 1822 are shown with a central portion of a mold extending therethrough, such as first mold central portion 1832 and second mold central portion 1834. Second mold central portion 1834 is shown with an unmolded image wrapped rod 1710 disposed therein. Note that the side of unmolded image wrapped rod 1710 is closer to one side of second mold central portion 1834 than to another side. This place would yield an image rod with a non-centered finished image rod molded covering end portion 1912 (FIG. 19). To make the finished image rod 1900 have a centered finished image rod molded covering end portion 1912, a top cap similar to end cap 1600 could be placed over the top of second mold central portion 1834 and the solid rod end 1512 would be placed through the end cap bottom face central orifice grommet 1620. In a preferred embodiment, the end cap 1600 could be adapted for use on the top portion of the PVC pipe by proving at least one ventilation opening, which permits the pressure inside the mold, made up of end cap 1600, end cap bottom face central orifice grommet 1620, and a corresponding upper end cap, which is ventilated, with a PVC pipe disposed therebetween. In some embodiments, the end cap 1600 at the bottom could be fixed to the PVC pipe and the upper end cap (with the ventilation) might be not fixed and configured for each removal.

Mass production rates can be improved when all of the PVC pipes in all of the molding system fixture mold receiving plate orifices 1822 are filled with molds, and the molds filled with unmolded image wrapped rod 1710 and the gap between the unmolded image wrapped rod 1710 and the interior surface of the PVC pipe is filled with an acrylic resin, polycarbonate or other suitable transparent fluid which can form a hard surface. The top cap (with ventilation) is placed over each of the solid rod ends 1512 and the lid of the molding system pressure chamber 1810 is closed and the pressure in the chamber would be changed to aid in removal of bubbles in the acrylic resin, etc. In a preferred embodiment, the pressure is increased and bubbles in the acrylic resin, or the like, are removed or reduced to a size which is not visible.

When the process is completed, a finished image rod 1900 is produced and is removed from the molds.

Now referring to FIG. 19, the finished image rod 1900 is shown with a finished image rod molded covering end portion 1912, which appears to be thinner when viewed from an intermediate location along its longitudinal axis and much wider when it is viewed from the solid rod end 1512.

The above-described method and system are believed to be helpful in making finished image rods 1900, which can be used in game calls and many other applications.

It is thought that the method and apparatus of the present invention will be understood from the foregoing description, and it will be apparent that various changes may be made in the form, construction, steps and arrangement of the parts and steps thereof, without departing from the spirit and scope of the invention, or sacrificing all of the material advantages, the form herein described being merely a preferred or exemplary embodiment thereof.

We claim:

1. A method of making a wild game taking aid comprising the steps of:
   providing an elongated transparent member having a circular cross-section, and an outer cylindrical surface;
   providing image matter, with a predetermined image thereon, configured to cling to said outer cylindrical surface without use of an adhesive;
   wrapping said image matter around said outer cylindrical surface to form an unmolded image wrapped member;
   providing a cylindrical mold disposed around said unmolded image wrapped member;
   centering said unmolded image wrapped member within said cylindrical mold;
   filling said cylindrical mold with a fluid which can form a transparent hard surface;
   reducing an air pressure characteristic in said cylindrical mold so as to facilitate a reduction of bubbles formed in said fluid;
   removing a molded image wrapped member from said cylindrical mold, where said predetermined image is visible through an outer portion of said molded image wrapped member; and
   deploying said molded image wrapped member as a portion of a wild game taking aid.

2. The method of claim 1 wherein said wild game taking aid is a handle of a fishing pole.

3. The method of claim 1 wherein said wild game taking aid is a waterfowl game call.

4. The method of claim 3 wherein said elongated transparent member is a tube.

5. The method of claim 1 wherein said step of providing a cylindrical mold comprises the step of:
   providing a first pipe end cap, which is a first polyvinyl chloride (PVC) pipe end cap;
   providing a first grommet in a first end cap central orifice in said first pipe end cap; and
   inserting a first end portion of said unmolded image wrapped member through a first grommet central orifice, so that a combination of said first pipe end cap, said first grommet and said unmolded image wrapped member, create a mold for containing said fluid.

6. The method of claim 5 further comprising the step of providing an elongated PVC pipe section configured to mate with said first pipe end cap.

7. The method of claim 6 wherein said step of centering said unmolded image wrapped member within said cylindrical mold comprises the steps of:
   providing a second pipe end cap, which is a second PVC pipe end cap, which is configured to mate with said elongated PVC pipe section;
   providing a second grommet in a second end cap central orifice in said second pipe end cap; and
   inserting a second end portion of said unmolded image wrapped member through a second grommet central orifice, so that a combination of said second pipe end cap, said second grommet and said unmolded image wrapped member, center said unmolded image wrapped member within said cylindrical mold but does not prohibit gases from exiting said cylindrical mold.

8. The method of claim 7 wherein said first pipe end cap and said second pipe end cap are identical except that said second pipe end cap has a ventilation orifice therethrough.

9. The method of claim 1 wherein said step of wrapping said image matter around said outer cylindrical surface results in no overlapping of a first end of the image matter onto a second end of the image matter.

10. The method of claim 1 wherein said step of reducing an air pressure characteristic comprises the steps of:
    providing a vacuum chamber configured to create an internal pressure which is less than atmospheric air pressure outside of said vacuum chamber;
    providing a fixture within said vacuum chamber for holding a plurality of cylindrical molds each in a non-horizontal orientation;
    placing said cylindrical mold into said fixture; and
    removing gases from said vacuum chamber.

11. The method of claim 8 wherein said elongated transparent member is longer than a combination of said first pipe end cap, said elongated PVC pipe section and said second pipe end cap.

12. The method of claim 11 further comprising the step of cutting said molded image wrapped member into a plurality of pieces where each of said plurality of pieces is deployed as a portion of a wild game taking aid.

13. The method of claim 1 wherein said image matter is a rectangular piece of vinyl film which has a longitudinal dimension and a width dimension which is less than a circumference of said outer cylindrical surface.

14. The method of claim 13 further comprising the step of removing said image matter from a paper backing substrate.

15. The method of claim 10 wherein said fixture is configured to receive a plurality of molds therein having different diameter sized PVC pipes therein.

16. The method of claim 15 wherein said fixture comprises a plurality of elongated threaded rod configured to hold near and separate a molding system fixture top plate and a molding system fixture bottom plate.

* * * * *